US008692880B2

(12) United States Patent  
Tobiason (10) Patent No.: US 8,692,880 B2  
(45) Date of Patent: Apr. 8, 2014

(54) IMAGE CORRELATION DISPLACEMENT SENSOR

(75) Inventor: Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 307 days.

(21) Appl. No.: 12/898,642

(22) Filed: Oct. 5, 2010

(65) Prior Publication Data

US 2012/0081543 A1    Apr. 5, 2012

(51) Int. Cl.  
*H04N 5/30* (2006.01)

(52) U.S. Cl.  
USPC ........................................................ 348/140

(58) Field of Classification Search  
USPC .................................. 348/128, 131; 382/108  
See application file for complete search history.

(56) References Cited

U.S. PATENT DOCUMENTS

| | | | |
|---|---|---|---|
| 5,434,632 A * | 7/1995 | Carmichael | 353/101 |
| 5,783,752 A | 7/1998 | Thorburn | |
| 6,256,016 B1 | 7/2001 | Piot | |
| 6,352,508 B1 | 3/2002 | Pang | |
| 6,642,506 B1 | 11/2003 | Nahum | |
| 7,295,324 B2 | 11/2007 | Jones | |
| 7,515,280 B2 | 4/2009 | Emtman | |
| 2002/0036904 A1 * | 3/2002 | Kawashima et al. | 362/276 |
| 2004/0190749 A1 | 9/2004 | Xu | |
| 2007/0211256 A1 * | 9/2007 | Medower et al. | 356/491 |

FOREIGN PATENT DOCUMENTS

EP     1 262 738 A1    12/2002

OTHER PUBLICATIONS

Gao, W., "Micro and Nano Measurement Instruments," Proceedings of the 10th International Conference of the European Society for Precision Engineering & Nanotechnology, Delft, Netherlands, May 31-Jun. 4, 2010, pp. 235-238.

Krüger, S., and A. Calway, "Image Registration Using Multiresolution Frequency Domain Correlation," Proceedings of the Ninth British Machine Vision Conference, Southampton, U.K, Sep. 1998, pp. 316-325.

Lichtenberger, R., and H. Schreier, "Contactless and Fullfield 3D-Deformation Measurement for Impact and Crash Tests," LIMESS Messtechnik u. Software GmbH, Pforzheim, Germany, 8 pages.

(Continued)

*Primary Examiner* — Christopher S Kelley  
*Assistant Examiner* — Jonathan Messmore  
(74) *Attorney, Agent, or Firm* — Christensen O'Connor Johnson Kindness PLLC (57) ABSTRACT

An image correlation displacement sensor for measuring a displacement component along a direction perpendicular to a target surface, with a simple configuration. The sensor may include: an illumination portion (130') which emits illumination light; an imaging portion including at least two optical paths (A and B') which are used to capture multiple images of a speckle field produced by the target surface (300), one of which (A) is inclined with respect to a normal to the target surface in proximity to the target surface, and an element (110') which deflects an at least one of the optical paths (A and B'); and a processing portion (200) which measures a displacement relative to the target surface along a direction which includes a component normal to the target surface (300) in accordance with the correlation of multiple images captured in the optical paths (A) and (B').

24 Claims, 7 Drawing Sheets

(56) References Cited

OTHER PUBLICATIONS

Ourselin, S., et al., "Block Matching: A General Framework to Improve Robustness of Rigid Registration of Medical Images," Proceedings of the Third International Conference on Medical Image Computing and Computer-Assisted Intervention (MICCAI 2000), Pittsburgh, Oct. 11-14, 2000, Lecture Notes in Computer Science 1935:557-566, 2000.

Su, C., and L. Anand, "A New Digital Image Correlation Algorithm for Whole-Field Displacement Measurement," SMA Annual Symposium on Innovation in Manufacturing Systems & Technology (IMST), Singapore, Jan. 17-18, 2003, 8 pages.

Vendroux, G., and W.G. Knauss, "Submicron Deformation Field Measurements II: Improved Digital Image Correlation," Technical Report, California Institute of Technology, Pasadena, Calif., 1994, pp. 1-14.

Yu, J.H., et al., "Real-Time Full-Field Deformation Analysis on the Ballistic Impact of Polymeric Materials Using High—Speed Photogrammetry," Report No. ARL-RP-0290, Army Research Laboratory, Apr. 2010 (a reprint from the American Society for Composites 24th Technical Conference, Newark, Del., Sep. 15-17, 2009), 16 pages.

Regez, B., et al., "In-Plane Deformation Measurements Using Digital Image Correlation of Ultrasonic C-Scan Image," Proceedings of the ASME 2003 International Mechanical Engineering Congress and Exposition (IMECE2003), Washington, D.C., Nov. 15-21, 2003, Abstract only, 1 page.

Zhou, P., and K.E. Goodson, "Subpixel Displacement and Deformation Gradient Measurement Using Digital Image/Speckle Correlation (DISC)," Optical Engineering 40(8)1613-1620, Aug. 2001.

Tobiason, J.D., "Image Correlation Displacement Sensor," U.S. Appl. No. 12/958,055, filed Dec. 1, 2010.

Briers, J.D., "Holographic, Speckle and Moiré Techniques in Optical Metrology," Progress in Quantum Electronics 17(3):167-233, 1993.

Extended European Search Report mailed Feb. 24, 2012, issued in corresponding European Application No. EP 11 183 964, filed Oct. 5, 2011, 8 pages.

* cited by examiner

IMAGE CORRELATION DISPLACEMENT SENSOR

INCORPORATION BY REFERENCE

U.S. Pat. No. 6,642,506, filed on Jun. 1, 2000, U.S. Pat. No. 7,295,324, filed on Jul. 13, 2004, and U.S. Pat. No. 7,515,280, filed on May 12, 2004, are each hereby incorporated in its entirety by reference.

BACKGROUND

1. Field of the Invention

The present invention relates to an image correlation displacement sensor, and more particularly, to an image correlation displacement sensor that captures speckle fields to measure a displacement of an object.

2. Description of Related Art

Image correlation displacement sensors using a correlation between a plurality of speckle fields (speckle images) are known (see U.S. Pat. Nos. 6,642,506; 7,295,324; and 7,515,280). In general, a coherent light source such as a laser light source is used for each image correlation displacement sensor. A speckle field is produced by illuminating an optically rough surface with the coherent light source. Specifically, a target surface is illuminated with coherent light, and light scattered from the target surface is detected by a detector such as a CCD camera or a CMOS image sensor. Thus, the speckle field can be captured in image or images.

First, a speckle field before displacement is captured, and the captured speckle field is stored into a memory or the like as a first speckle image. Next, a speckle field after displacement is captured, and the captured speckle field is stored into a memory or the like as a second speckle image. Then, a displacement of an object to be measured having a target surface is measured based on results of comparison between the first speckle image and the second speckle image.

In the image correlation displacement sensor that measures a displacement by capturing speckle fields, however, the direction of the displacement to be measured is limited. In other words, speckle fields are generally imaged along a direction that is normal to a receiving surface of a detector as well as normal to the target surface, which makes it difficult to measure a displacement along a direction perpendicular to the target surface.

An economical image correlation displacement sensor that accurately measures displacement along a direction including a component perpendicular to a target surface would be desirable.

SUMMARY

It is an object of the present invention to provide an image correlation displacement sensor capable of measuring a displacement along a direction including a component perpendicular to a target surface, using a compact and economical configuration. In some embodiments, displacement along a direction approximately perpendicular to a target surface is measured in combination with displacement along a direction approximately parallel to the target surface, using a compact and economical configuration. An exemplary aspect of the present invention is an image correlation displacement sensor for measuring a positional displacement relative to a target surface, the image correlation displacement sensor including: an illumination portion which emits illumination light to the target surface to produce a speckle field; an imaging portion including a first optical path which is used to capture a plurality of images of the speckle field produced on the target surface and is inclined with respect to a normal to the target surface in proximity to the target surface and a second optical path which is used to capture a plurality of images of the speckle field produced on the target surface and is inclined with respect to the first optical path in proximity to the target surface, the imaging portion including an element which deflects at least one of the first and second optical paths, and a processing portion which measures a displacement relative to the target surface along a direction which includes a component normal to the target surface in accordance with the plurality of images captured in the first optical path and the plurality of images captured in the second optical path.

According to an exemplary aspect of the present invention, it is possible to provide an image correlation displacement sensor capable of measuring a displacement along a direction including a component perpendicular to a target surface, with high accuracy, in a simple configuration.

The above and other objects, features and advantages of the present invention will become more fully understood from the detailed description given herein below and the accompanying drawings which are given by way of illustration only, and thus are not to be considered as limiting the present invention.

DETAILED DESCRIPTION

Exemplary embodiments of the present invention will be described below with reference to the accompanying drawings. In the following description, preferred exemplary embodiments of the present invention will be illustrated, but the scope of the present invention is not limited to the embodiments described below. In the following description, identical reference symbols denote identical or similar elements.

First Exemplary Embodiment

Figure 1:
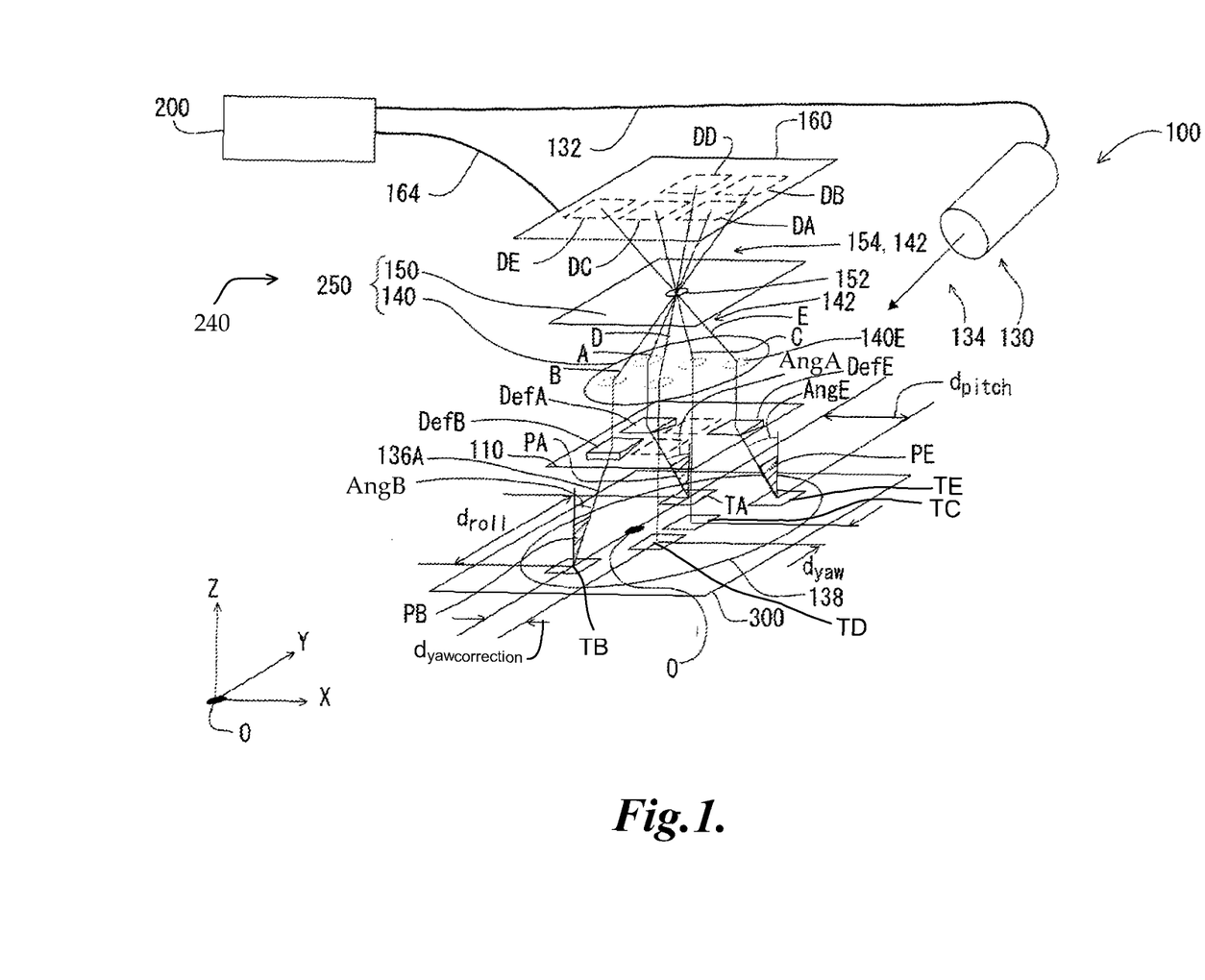
FIG. 1 is a diagram schematically showing an exemplary configuration of an image correlation displacement sensor according to a first exemplary embodiment of the present invention.

An image correlation displacement sensor according to a first exemplary embodiment of the present invention is described with reference to FIG. 1. FIG. 1 is a diagram schematically showing the overall configuration of the image correlation displacement sensor (hereinafter abbreviated as "displacement sensor"). A displacement sensor 100, which measures a displacement of an object to be measured having a target surface 300, includes an illumination portion 130, an imaging portion 240, and a processing portion 200. The displacement sensor 100 is mounted in a measuring head, for example.

For clarity of explanation, the image correlation displacement sensor according to the first exemplary embodiment is described using a three-dimensional Cartesian coordinate system. Referring to FIG. 1, a Z-direction is parallel to an input optical axis of an optical system 250 (described in greater detail below), an X-direction is perpendicular to the Z-direction and parallel to a row or column direction of a pixel array of a detector 160, and a Y-direction is perpendicular to the X-direction and Z-direction. Preferably, the displacement sensor 100 and/or the target surface 300 are arranged such that the Y-direction is parallel to a row or column direction of a pixel array of the detector 160, and the Z-direction is approximately normal to the target surface 300. In the following description, unless explicitly specified otherwise, the term "normal" refers to a normal to the target surface 300, and may also generally correspond to an input optical axis of the optical system 250. Further, as illustrated in FIG. 1, a point on the target surface 300 is defined as an origin O. The displacement sensor 100 is capable of measuring positional displacements along the X-direction, Y-direction, Z-direction, yaw direction, roll direction, and pitch direction. The displacement sensor 100 is configured to measure minute two-degree of freedom up to six-degree of freedom displacements with high accuracy, using an economical and compact configuration. Note that a positional displacement along the yaw direction corresponds to a rotation angle about a Z-axis; a positional displacement along the roll direction corresponds to a rotation angle about an X-axis; and a positional displacement along the pitch direction corresponds to a rotation angle about a Y-axis.

Figure 5:
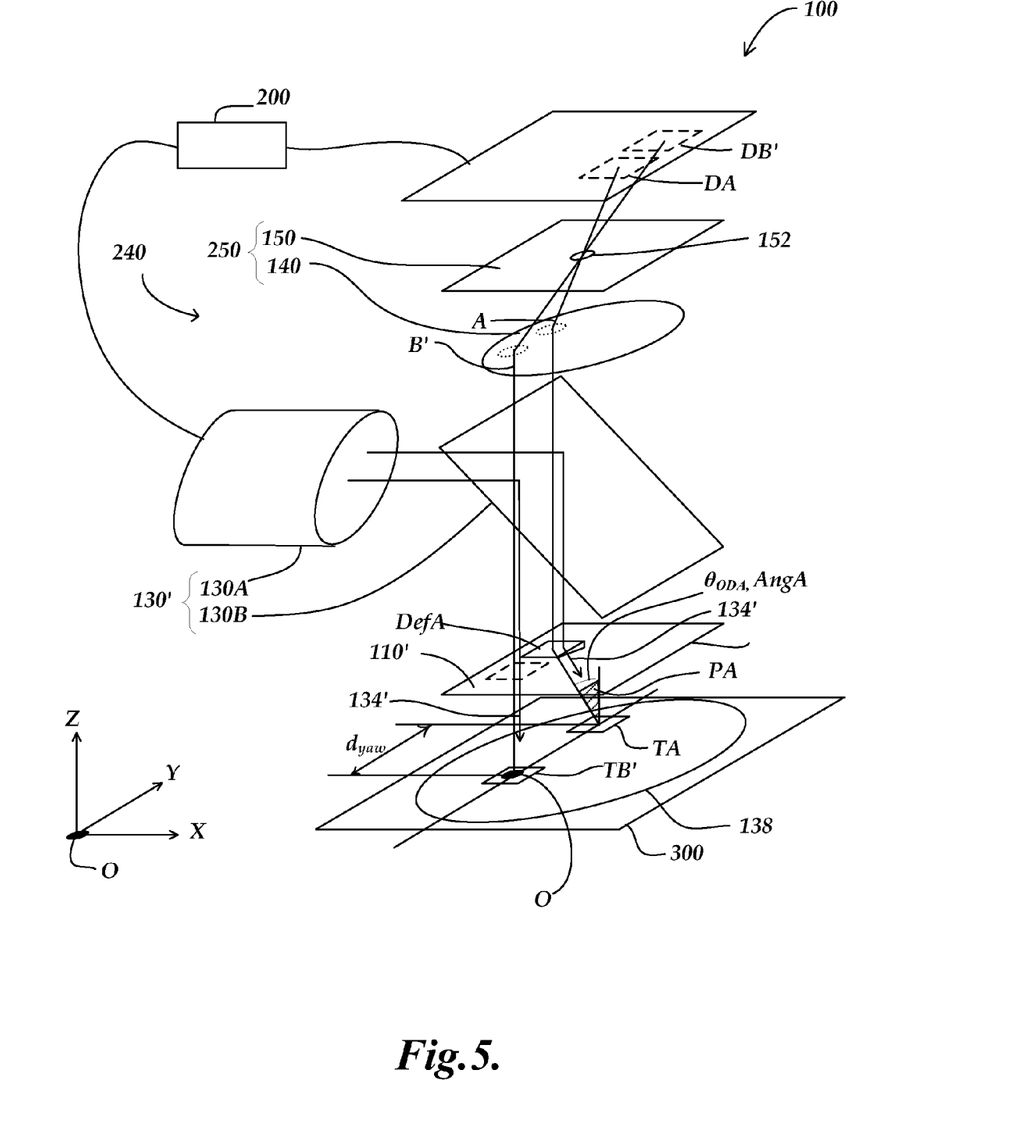
FIG. 5 is a diagram schematically showing an exemplary configuration of an image correlation displacement sensor according to a second exemplary embodiment of the present invention.

The illumination portion 130 emits coherent light to illuminate the target surface 300 of the object to be measured. Specifically, the coherent light emitted from the illumination portion 130 corresponds to illumination light 134 for illuminating the target surface 300. The illumination portion 130 includes a laser light source, for example. The illumination portion 130 may include any type of light source, as long as the light source can emit coherent light. The illumination light 134 from the illumination portion 130 may be incident on the target surface 300 along a desired design direction. In the embodiment shown in FIG. 1, the illumination direction is inclined with respect to the Z-direction, but this is not a requirement. One alternative illumination arrangement is shown in FIG. 5. When the illumination light 134 from the illumination portion 130 is incident on the target surface 300, an illumination spot 138 is formed on the target surface 300.

The target surface 300 typically is an optically rough diffusing surface. Accordingly, when the target surface 300 is illuminated with the coherent light, a speckle field is produced. In other words, the diffuse light reflected from the target surface 300 produces a speckle field. To form the illumination spot 138 with a desired size and shape, a lens or the like may be included in the illumination portion 130, if desired. For instance, the illumination spot 138 may be formed in an elliptical shape by providing a cylindrical lens in the illumination portion 130.

Light rays diffused in various directions by the target surface 300 interfere with each other to thereby produce a speckle field. In the displacement sensor 100 according to the first exemplary embodiment, such a speckle field is captured. The speckle field, which is produced by the interference of the diffused light rays, is produced in three dimensions. In other words, the speckle field fills a volume above the surface 300 and includes a speckle pattern that moves in correspondence to the surface 300. Thus, an image of the speckle field varies depending on the imaging direction and the position of the target surface 300 relative to the displacement sensor 100. It will be appreciated that the schematically represented target surface 300 shown in FIG. 1 may have any desired size, in practice.

Regarding the imaging portion 240, it includes an element 110, a lens 140, an aperture plate 150, and a detector 160. The element 110 includes at least one optical element for deflecting the diffused light (e.g., a deflection element DefA, DefB and/or DefE, as described further below). A deflection element of the element 110 provides a deflection angle for an optical path that is used to capture images of the speckle field produced by the target surface 300, such that the optical path is inclined at a "triangulation angle" with respect to a normal to the target surface 300 in proximity to the target surface. As a brief and approximate explanation of operation of imaging along a deflected optical path, it may be said that by imaging the speckle pattern produced by the target surface 300 at this inclined "triangulation angle", that the motion of the target surface 300 along Z-direction results in the imaged field of view moving along the Y-direction relative to the target surface 300. This results in the corresponding speckle image displacing along Y-direction on the detector 160 in response to Z-direction motion, such that the Z-direction displacement may be determined based on the corresponding Y-direction displacement, as described in greater detail below.

In the embodiment shown in FIG. 1, a deflection angle deflects the optical path in the YZ plane. The speckle image light deflected by the element 110 enters the lens 140. The lens 140 is a convex lens, for example, and refracts and/or focuses the speckle image light. Speckle image light (e.g., the light beams 142) refracted and/or focused by the lens 140 reaches the aperture plate 150. An open aperture 152 is located at the center of the aperture plate 150.

In a preferred embodiment, the imaging portion 240, the lens 140 and the aperture plate 150 are configured as an optical system 250 that is a telecentric system. That is, the lens 140 and the aperture 152 are spaced apart from each other by approximately the back focal length of the lens 140. The lens 140 may be located at approximately its front focal length from the target surface 300 in some embodiments, such that it images the speckle field adjacent to the target surface 300. The aperture 152 is located approximately on the optical axis of the lens 140. Light beams falling outside of the aperture 152 are blocked by the aperture plate 150. Accordingly, a particular light beam 142 from a particular optical path entering the aperture 152 passes through and reaches the detector 160 at a particular location (e.g., the locations corresponding to the detectors or detector portions DA, DB and/or DE, as described further below) that correspond to particular portion of the speckle field and/or the adjacent portion of the target surface 300. When the optical system 250 is telecentric, only speckle image light beams that are approximately parallel to the optical axis of the lens 140 are the light beams 142 that pass through the aperture 152 to become the detected light beams 154. Thus, a particular deflector element (e.g., DefA, DefB, etc.) of the element 110 located on the incident side of the optical system 250 serves to receive an input beam along a portion of a first optical path that is inclined with respect to a normal to the target surface 300 in proximity to the target surface 300, and then deflect that input beam to be parallel to the optical axis of the lens 140 such that it passes through the aperture 152 to reach a particular detector or detector portion (e.g., DA, DB, etc.). Of course, a second optical path that is approximately normal to the target surface 300 may pass through a portion of the element 110 that does not include a deflector element (as illustrated by dotted outline portions without deflector elements in FIG. 1), such that it remains parallel to the optical axis of the lens 140 and passes through the aperture 152 to reach a particular detector or detector portion (e.g., DC, DD, etc.).

The detector 160 captures the speckle field produced on the target surface 300. In the embodiment shown in FIG. 1, the detector 160 is a single two-dimensional array of photodetector pixels which is, for example, a CCD (Charge Coupled Device) camera or a CMOS (Complimentary Metal Oxide Semiconductor) image sensor.

Further, the detector 160 includes a detection portion DA, a detection portion DB, a detection portion DC, a detection portion DD, and a detection portion DE. Herein, the detection portion DA comprises a part of a single detector 160. Similarly, each of the detection portions DB, DC, DD, and DE comprises a part of the detector 160. Each of the detection portions DA to DE has a two-dimensional pixel array. The detection portions DA to DE are disposed at different positions on the receiving surface of the detector 160. Preferably, the detection portions DA to DE are disposed at different positions on the receiving surface of the detector 160 so as not to overlap each other. The detection portion DA receives the speckle image light from an area TA on the target surface 300 to capture a speckle image. Similarly, the detection portions DB, DC, DD, and DE respectively receive the speckle image from areas TB, TC, TD, and TE (also see FIG. 2) on the target surface 300 to capture speckle images. Thus, the motion of the target surface 300 may be detected at multiple points and/or imaging angles, and the resulting images may used to determine its motion. In particular, motion normal to the target surface 300 may be determined with high resolution and accuracy using a compact and economical configuration.

Figure 2:
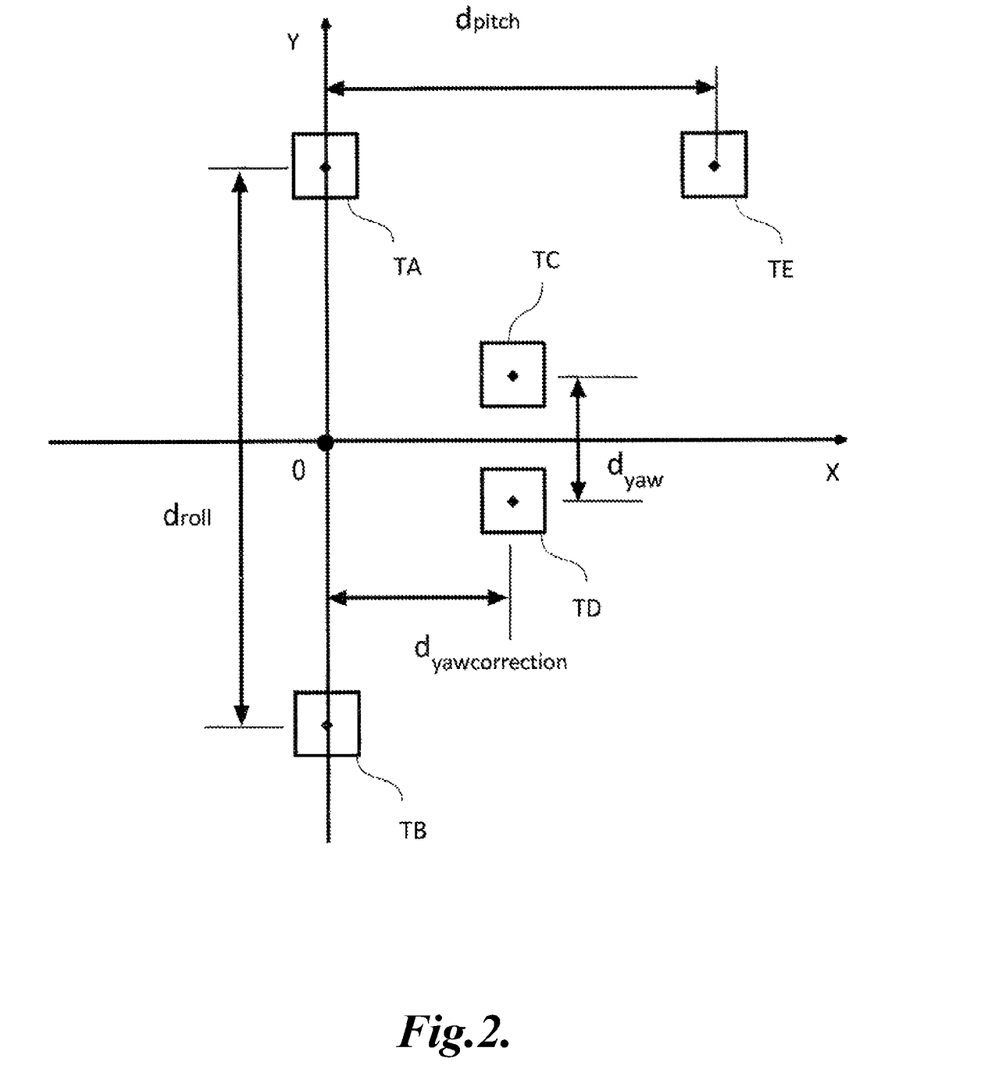
FIG. 2 is a plan view showing one exemplary arrangement of imaged areas on a target surface.

The exemplary configuration of the imaged areas TA to TE, shown on the target surface 300 in FIG. 1, is illustrated more clearly in FIG. 2. FIG. 2 is view along a direction normal to the XY plane showing the positional relationships, which are fixed by design, among the areas TA to TE when the target surface 300 is at a nominal operating gap relative to the displacement sensor 100. The portions of the speckle field imaged along the optical paths that include the areas TA to TE are changed by relative movement of the target surface 300. Accordingly, the amount of relative movement, or the positional displacement, of the target surface 300 can be calculated based on obtaining the amount of speckle image displacement observed along the optical paths corresponding to the areas TA to TE.

The areas TA and TB are arranged on the Y-axis and symmetrically about the X-axis. The area TA is disposed on the +Y side with respect to the origin O, and the area TB is disposed on the −Y side with respect to the origin O. A distance between the areas TA and TB is represented by $d_{roll}$. The areas TC and TD are also arranged symmetrically about the X-axis. The area TC is disposed on the +Y side with respect to the origin O, and the area TD is disposed on the −Y side with respect to the origin O. The X-coordinates of the areas TC and TD are the same. The X-coordinate of each of the areas TC and TD is represented by $d_{yawcorrection}$. In other words, the areas TC and TD are spaced apart from the areas TA and TB by $d_{yawcorrection}$ in the X-direction. A distance between the areas TC and TD is represented by $d_{yaw}$. The area TE is spaced apart from the area TA by $d_{pitch}$ in the +X-direction. Accordingly, the X-coordinate of the area TE may be $d_{pitch}$. The positions in the Y-direction of the areas TA and TE are the same. In the above description, the position of each area corresponds to the center position or "detected position" of each area when operating at the nominal operating gap. Referring to FIG. 2, the areas TA to TE are square in shape, but the operational shape of each of the imaged areas TA to TE may be defined by the design of the optical system and/or detector signal processing choices and is not particularly limited. The areas TA to TE may have different sizes or the same size. The illumination portion 130 illuminates a sufficiently wider area than the area including the areas TA to TE.

The imaging portion 240 captures the speckle fields that are imaged along the optical paths that include areas TA to TE. The speckle fields imaged along these optical paths are projected onto different locations of a single detector 160 as described above. Assume herein that an optical path for capturing the speckle field produced proximate to the area TA is an optical path A. Speckle image light from the area TA propagates along the optical path A and enters the detection portion DA. Similarly, assume that optical paths for capturing the speckle fields produced proximate to the areas TB, TC, TD, and TE are optical paths B, C, D, and E, respectively (see FIG. 1). The optical path A herein described refers to a principal ray of a light flux that propagates through the aperture 152 from a speckle field proximate to area TA and enters the detection portion DA. Similarly, the optical paths B to E respectively refer to principal rays of the speckle image light that propagates through the aperture 152 from speckle filed adjacent to the target surface 300 and enters the detection portions DB to DE. For instance, a line connecting the center of the area TC and the center of the detection portion DC via the center of the aperture 152 corresponds to the optical path C. As described later, the various optical paths A to E may be deflected by the element 110.

As illustrated in FIG. 1, an angle AngA is formed between the normal and a first portion of the optical path A in proximity to the target surface 300. Similarly, angles AngB and AngE are respectively formed between the normal and first portions of the optical paths B and E in proximity to the target surface 300. Note that the phrase "in proximity to the target surface 300" indicates a space between the target surface 300 and the element 110.

In proximity to the target surface 300, the first portions of the optical paths C and D are parallel to the Z-direction. Accordingly, the corresponding angles AngC and AngD are 0°. In the embodiment shown in FIG. 1, the optical paths A and B are inclined at the same angle from the normal and are inclined in opposite directions in the same YZ plane. In other words, the positions in the X-direction of the optical paths A and B and the areas TA and TB are nominally identical in proximity to the target surface 300. A plane PA which includes the optical path A and the normal extending from an intersection between the optical path A and the target surface 300 and a plane PB which includes the optical path B and the normal extending from an intersection between the optical path B and the target surface 300 are disposed in the same plane. In proximity to the target surface 300, the optical path A is parallel to the optical path E. A plane PE which includes the optical path E and the normal extending from an intersection between the optical path E and the target surface 300 is parallel to the plane PA. Accordingly, the angles AngA, AngB, and AngE are equal to each other in this particular embodiment, and are represented by $\theta_{ODA}$. The angle $\theta_{ODA}$ may most generally fall in an angular range from 0° to 90°. However, a smaller angular range including 45 degrees is preferred in various embodiments.

The element 110 is configured to deflect light rays along the first portions of the optical paths A, B, and E to change the directions thereof, such that they become parallel to the optical axis of the lens 140 and pass through the aperture 152 to the detector 160 in the desired manner. Conversely, it might be said that the element 110 is configured to select the directions of the first portions of the optical paths A, B, and E, such that after deflection at the element 110 they become parallel to the optical axis of the lens 140 and pass through the aperture 152 to the detector 160 in the desired manner. Assume herein that a part of the element 110 that deflects the optical path A is an optical deflector element DefA. Similarly, assume that a part of the element 110 that deflects the optical path B is an optical deflector element DefB, and a part of the element 110 that deflects the optical path E is an optical deflector element DefE. The optical deflector elements DefA, DefB, and DefE each have a wedge shape. The optical paths A, B, and E are deflected by the optical deflector elements DefA, DefB, and DefE, respectively, and are made parallel to the Z-direction. The optical deflector elements DefA, DefB, and DefE may have the same shape. Further, the optical deflector elements DefA and DefE may be disposed in the same direction so that the optical paths A and E, which are parallel to each other, are deflected at the same deflection angle. For example, the optical deflector element DefE may be disposed at a position spaced apart from and aligned in parallel with the optical deflector element DefA in the X-direction. The optical deflector elements DefA and DefB may be disposed to face each other so that the optical paths A and B, which approach each other, are coplanar. In other words, the optical deflector elements DefA and DefB may be arranged with mirror symmetry about the Z-axis or the XZ plane.

Further, the element 110 allows the first portions of the optical paths C and D, which are parallel to the Z-direction, to transmit without deflection. Thus, the optical paths C and D remain parallel to the Z-direction. Accordingly, the portions of the optical paths A to E between the element 110 and the lens 140 are parallel to the Z-direction. In other words, the element 110 provides deflection angles that make the optical paths A, B, and E, which are inclined with respect to the Z-direction, parallel to the Z-direction. Note that the optical deflector elements DefA, DefB, and DefE may be integrally formed or separately formed.

The optical paths A to E passing through the element 110 enter the lens 140. Accordingly, the optical paths A to E are refracted by the lens 140 and are directed to the aperture 152. The optical paths A to E are incident on different portions of the lens 140, designated 140A to 140E respectively. For instance, the light flux from the area TE that includes the optical path E has a principal ray that passes through a lens or lens portion 140E which is a part of the lens 140. It will be appreciated that an optical path (e.g., the optical path A) is primarily defined by the location of a detector (e.g., the detector DA) and the aperture 152. The location of a lens portion (e.g., 140A) that is associated with a particular optical path (e.g., optical path A) is the portion of the lens 140 that is aligned with those elements. Then, for a telecentric system, the portion of the element 110 that is associated with that optical path (e.g., optical path A) is the portion that is aligned with that lens portion along a direction parallel to the optical axis of the lens 140. That portion of the element 110 may include a deflector element (e.g., the deflector element DefA) if desired for a particular embodiment. The deflector element will then determine the direction of inclination of the portion of that optical path between the element 110 and the target surface 300. Light beams which propagate in directions significantly different from the optical paths A to E, or light beams which are significantly deviated from the principal rays, are blocked by the aperture plate 150. One skilled in the art may configure various embodiments, in addition to those disclosed herein, according to these design principles.

The optical paths A to E passing through the aperture 152 reach the detection portions DA to DE, respectively. The detection portion DA captures a speckle field image along the optical path A. In this case, the optical path A is inclined at the angle AngA and is used to capture a speckle field in a direction inclined at the angle AngA from the normal to the target surface 300 in proximity to the target surface 300. Similarly, the detection portions DB to DE capture speckle fields along the optical paths B to E, respectively. The optical paths B and E are inclined at the angles AngB and AngE, respectively, and are used to capture speckle fields in directions inclined at the angles AngB and AngE, respectively, from the normal to the target surface 300 in proximity to the target surface 300. The optical paths C and D are parallel to the normal to the target surface 300 in proximity to the target surface 300. Accordingly, the optical paths C and D are used to capture speckle fields along a direction normal to the target surface 300 in proximity to the target surface 300.

Herein, the speckle fields produced along the optical paths A-E (e.g., in the areas TA to TE) are captured by a single detector 160. Image data of the speckle fields acquired by the detector 160 is transmitted through a signal line 164 and is input to the processing portion 200. The imaging portion 240 captures speckle fields multiple times for each of the optical paths A-E. Then, the image data of a plurality of speckle fields is stored in the processing portion 200. In other words, the detection portion DA captures the speckle field, which is produced along optical paths A, multiple times. Then, the processing portion 200 stores the image data of the plurality of captured speckle fields. Similarly, the processing portion 200 stores a plurality of image data items of the speckle fields (speckle image data) produced along optical paths B-E. The processing portion 200 carries out a correlation processing based on the speckle image data. Specifically, a displacement is measured by obtaining a correlation between speckle image data acquired before movement and speckle image data acquired after movement. Then, for the configuration shown in FIG. 1, the processing portion 200 may determine displacements for six degrees of freedom, as described further below. Further, the processing portion 200 may control the illumination light 134 of the illumination portion 130 through a signal line 132.

The processing portion 200 is an information processor such as a personal computer or DSP, and performs a predetermined calculation processing for image data. More specifically, the processing portion 200 is a computer including a CPU and a storage area such as a memory. For instance, the processing portion 200 includes a CPU (Central Processing Unit) serving as an arithmetic processing portion, a storage area such as a ROM (Read Only Memory) or a RAM (Random Access Memory), and a communications interface, and executes processing necessary for measuring displacements. The ROM stores, for example, an arithmetic processing program for performing an arithmetic processing and various configuration data. The CPU reads out the arithmetic processing program stored in the ROM, and develops the program in the RAM. Then, the program is executed according to the configuration data and the output from the detector 160 and the like. In addition, the processing portion 200 may include a monitor or the like for displaying results of the arithmetic processing.

Figure 3:
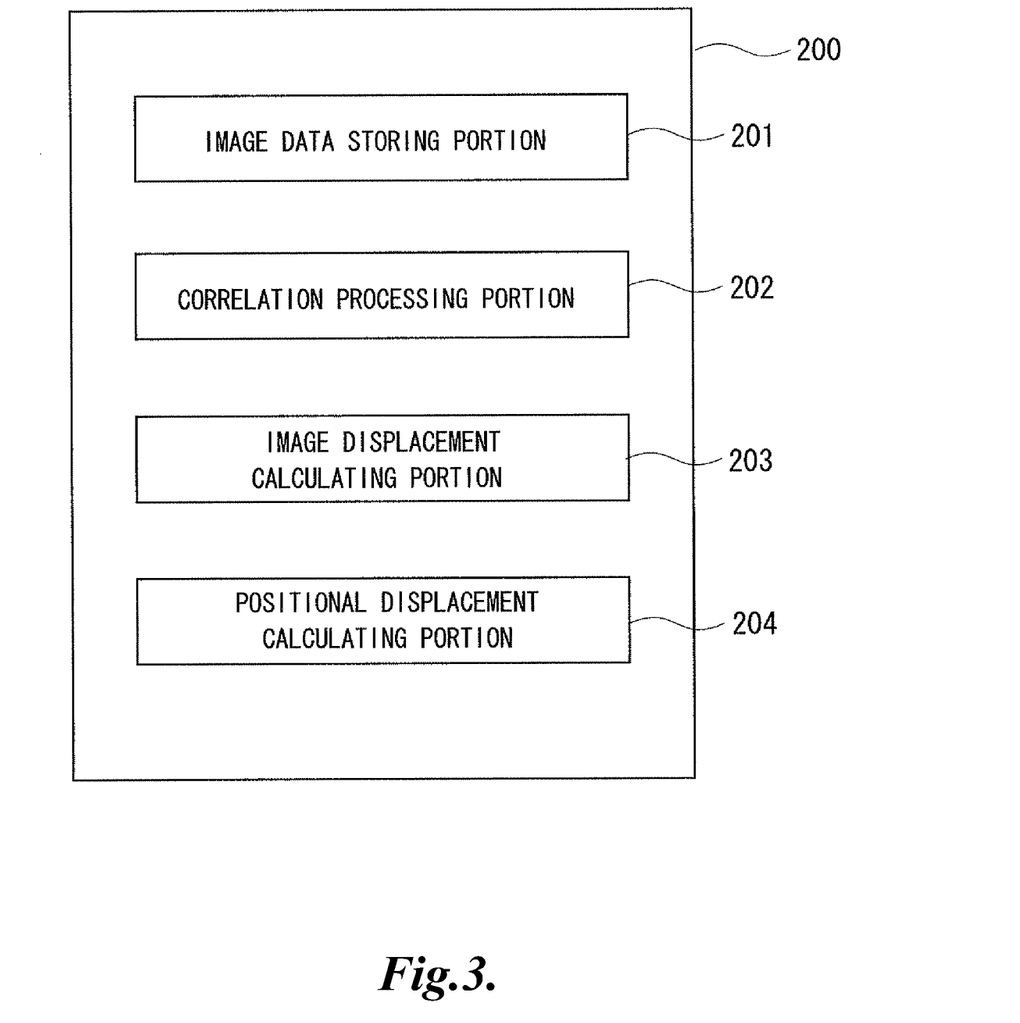
FIG. 3 is a block diagram showing an exemplary configuration of a processing device used for the image correlation displacement sensor.

An exemplary processing executed in the processing portion 200 will be described with reference to FIG. 3. FIG. 3 is a block diagram showing an exemplary configuration of some elements of the processing portion 200. The processing portion 200 includes an image data storage portion 201, a correlation processing portion 202, an image displacement calculating portion 203, and a positional displacement calculating portion 204.

The image data storage portion 201 stores speckle images, which are acquired before and after the movement of the target surface 300, as image data. For instance, a speckle image acquired before the relative moment of the target surface 300 is set as a reference speckle image, and a speckle image acquired after the movement is set as a measured speckle image. Assume herein that a speckle image captured along the optical path "i" is a speckle image $DS_i$ (where i=A, B, C, D, E). The speckle image $DS_i$ acquired before the movement is set as a reference speckle image $DS_{iR}$, and the speckle image $DS_i$ acquired after the movement is set as a measured speckle image $DS_{iC}$.

The correlation processing portion 202 compares the reference speckle image $DS_{iR}$ with the measured speckle image $DS_{iC}$ and performs a correlation processing. Specifically, the correlation processing portion 202 adds an offset along a displacement direction to the measured speckle image, and calculates a correlation value between the reference speckle image and the measured speckle image. In this case, an offset is added along the X-direction and Y-direction in which the light-receiving pixel array of the detector 160 is arranged. In other words, an offset along the X-direction and an offset along the Y-direction are separately added to the measured speckle image. Note that the directions along which an offset is added are not limited to the X-direction and Y-direction. The correlation processing portion 202 calculates a correlation value for each offset. As for the correlation processing, methods disclosed in U.S. Pat. Nos. 6,642,506, 7,295,324, and 7,515,280, or methods disclosed in the documents cited in these documents may be employed, for example.

The image displacement calculating portion 203 calculates an image displacement based on results of the correlation processing. The image displacement is a value corresponding to a positional displacement of the measured speckle image with respect to the reference speckle image. For instance, an offset value obtained when the correlation value is greatest corresponds to an image displacement. The image displacement may be a pixel displacement corresponding to a light-receiving pixel of the detector 160. The number of pixels by which the speckle image is moved in the receiving surface, for example, may be used as the image displacement. Alternatively, known design constants may be used to convert a displacement in pixels to an displacement of the target surface 300 which is used as the image displacement. For example, the pixel displacement can be converted into the actual displacement by using an imaging magnification or the like. In the manner as described above, the image displacement is calculated.

The correlation processing portion 202 and the image displacement calculating portion 203 perform a similar processing on the speckle images acquired along the optical paths A to E. For instance, the correlation processing portion 202 executes the correlation processing on the reference speckle image $DS_{AR}$ and the measured speckle image $DS_{AC}$ captured along the optical path A. Then, the image displacement calculating portion 203 calculates an image displacement based on results of the correlation processing. In this manner, the displacement between the reference speckle image $DS_{AR}$ captured along the optical path A and the measured speckle image $DS_{AC}$ is obtained. As a result, the amount of movement of the target surface 300 proximate to the area TA in the X-direction and Y-direction can be obtained, as outlined further below. Herein, the image displacement of the speckle image along the optical path A is represented by $(X_A, Y_A)$, and the image displacement $(X_A, Y_A)$ corresponds to the amount of movement of the target surface 300 proximate to the area TA.

Similarly, the correlation processing portion 202 may execute the correlation processing on the reference speckle images $DS_{BR}$, $DS_{CR}$, $DS_{DR}$, and $DS_{ER}$ and the measured speckle images $DS_{BC}$, $DS_{CC}$, $DS_{DC}$, $DS_{EC}$ captured along the optical paths B, C, D, and E, respectively. Then, the image displacement calculating portion 203 calculates image displacements $(X_B, Y_B)$, $(X_C, Y_C)$, $(X_D, Y_D)$, and $(X_E, Y_E)$ of the speckle images along the optical paths B, C, D, and E, respectively. $X_A$, $X_B$, $X_C$, $X_D$, and $X_E$ denote the image displacements along the X-direction, and $Y_A$, $Y_B$, $Y_C$, $Y_D$, and $Y_E$ denote the image displacements along the Y-direction.

The positional displacement calculating portion 204 calculates a positional displacement based on the image displacement. The positional displacement corresponds to the amount of relative movement of the target surface 300 with respect to the displacement sensor 100. In other words, the positional displacement corresponds to the amount of movement of the object to be measured having the target surface 300 with respect to the displacement sensor 100.

For instance, for the embodiment shown in FIGS. 1 and 2, a positional displacement X along the X-direction can be obtained using the image displacements $X_A$, $X_B$, $X_C$, and $X_D$ as shown in the following formula (1).

$$X = K_X * \mathrm{MEAN}(X_A, X_B, X_C, X_D) \tag{1}$$

Note that the function MEAN represents a mean value for the X-direction displacement, which rejects the influence of yaw on the individual image displacements. $K_X$ is a scale factor between the image displacement and the positional displacement in the X direction. Accordingly, the positional displacement X along the X-direction can be obtained based on a mean value of the image displacements $X_A$, $X_B$, $X_C$, and $X_D$ along the optical paths. A rotational positional displacement $\theta_{yaw}$ about the Z axis can be obtained using the known distance $d_{yaw}$ and the image displacements $X_C$ and $X_D$ as shown in the following formula (2).

$$\theta_{yaw} = a\tan(K_X * (X_C - X_D) d_{yaw}) \tag{2}$$

When the target surface 300 rotates about the Z-axis, the areas TC and TD shown in FIG. 2 are moved in the X-direction. Further, the areas TC and TD are moved in the opposite direction relative to a midpoint between them. Accordingly, the rotational positional displacement $\theta_{yaw}$ is calculated based on a difference between the image displacement $X_C$ and the image displacement $X_D$. It will be appreciated that formula (2) may be sufficiently accurate for small rotation angles. For certain applications and/or larger rotation angles, an expression with fewer simplifying approximations may be used to provide better accuracy.

A positional displacement Y along the Y-direction can be obtained using the image displacements $Y_C$, and $Y_D$ along the Y-direction as shown in the following formula (3).

$$Y = K_Y * \mathrm{MEAN}(Y_C, Y_D) - \Delta Y_{yaw} \tag{3}$$

$K_Y$ is a scale factor between the image displacement and the positional displacement in the Y direction. $\Delta Y_{yaw}$ represents an image displacement along the Y-direction due to the rotational positional displacement $\theta_{yaw}$ about the Z axis, described below. As illustrated in FIG. 2, for example, the areas TC and TD are separated from the Z axis by an X-direction dimension $d_{yawcorrection}$. Accordingly, the areas TC and TD are moved in the same direction with the rotation about the Z-axis, even if the target surface 300 is not, as a whole, translated along the Y-direction. Thus, the positional displacement Y along the Y-direction is calculated by correcting the image displacements $Y_C$ and $Y_D$ by the amount of $\Delta Y_{yaw}$. In the target surface 300, the optical paths C and D are arranged symmetrically about the X-axis, simplifying the formulas related to overall Y-displacement. $\Delta Y_{yaw}$, used in formula (3), can be obtained by the following relationship (4).

$$\Delta Y_{yaw}=\theta_{yaw} \cos[a \tan(d_{yaw}/2d_{yawcorrection}]\cdot(d_{yawcorrection}^2+d_{yaw}^2/4)^{1/2} \quad (4)$$

Furthermore, a positional displacement Z along the Z-direction can be calculated using the image displacements $Y_A$ and $Y_B$ as shown in the following formula (5).

$$Z \approx K_Z*(Y_A-Y_B)/(2*\tan\theta_{ODA}) \quad (5)$$

$K_Z$ is a scale factor between the image displacement Y direction and the positional displacement in the Z direction, and generally depends on design geometry and magnification, as well as production deviations exhibited by each individual unit. $K_Z$ may be established by analysis and/or calibrated based on experiment. The formula (5) may be understood as follows. Due to the inclination angles AngA and AngB (e.g., at the angle $\theta_{ODA}$), the distance between the optical paths A and B decreases gradually from the target surface 300 toward the element 110. When the distance between the target surface 300 and the displacement sensor 100 changes, the positions of the intersections between the optical paths A and B and the speckle field proximate to the target surface 300 change, and thus the speckle images along the optical paths A and B appear to translate along the Y direction. For instance, as the distance between the target surface 300 and the displacement sensor 100 increases, the length of each of the optical paths A and B, which are inclined with respect to the normal to the target surface 300 in a plane parallel to the YZ plane, increases. Accordingly, the Y-direction distance between the imaged portions of the speckle field proximate to the areas TA and TB increases. This means that the image along the optical path A is moved in the +Y-direction and image along the optical path B is moved in the −Y-direction. The positional displacement Z along the Z-direction can be represented by a difference between $Y_A$ and $Y_B$. As the difference between the $Y_A$ and $Y_B$ increases, for example, the positional displacement Z along the Z-direction increases. For small displacements, a reasonable approximation of the ratio of the change in Y to the change in Z along the optical paths A and B is $\tan\theta_{ODA}$.

In the illustrated embodiment, the optical paths A and B are in the same plane, and the angles AngA and AngB are equal to each other. Between the target surface 300 and the element 110, the optical paths A and B are arranged symmetrically about the Z-axis. This symmetrical configuration makes it possible to measure the positional displacement Z along the Z-direction by a simple formula like the formula (5). The positional displacement along the Z-direction can be obtained by the speckle images captured along the optical paths A and B having different directions.

The rotational positional displacement $\theta_{pitch}$ about the Y-axis can be obtained using the image displacements $Y_A$ and $Y_E$ by the following formula (6).

$$\theta_{pitch}=a\tan[(K_Z*(Y_E-Y_A)/\tan\theta_{ODA})/(d_{pitch})] \quad (6)$$

The optical paths A and E are parallel to each other and the Y-coordinates of the areas TA and TE are the same. The target surface 300 rotates about the Y-axis according to the rotational positional displacement $\theta_{pitch}$. Due to this displacement, the position of the speckle producing areas TA and TE change in the Z-direction. Further, due to the inclination angles AngA and AngE (e.g., at the angle $\theta_{ODA}$) that are used for imaging, the Z displacement is reflected in the imaged position of the area TE along the Y-direction. Thus, the rotational positional displacement $\theta_{pitch}$ along the pitch direction can be indicated based on the difference between $Y_A$ and $Y_E$, and their separation along the X-direction, as shown in formula (6). It will be appreciated that formula (6) may be sufficiently accurate for small rotation angles. For certain applications and/or larger rotation angles, an expression with fewer simplifying approximations may be used to provide better accuracy.

As described above, the optical path E is used which is different from the optical paths A and B corresponding to the image displacements $Y_A$ and $Y_B$ for use in measuring the positional displacement Z along the Z-direction. In other words, the optical path E is provided in addition to the two optical paths A and B for use in measuring the positional displacement Z along the Z-direction direction. Further, the areas TE and TA are disposed at different positions relative to the Y-axis. This configuration enables measurement of the rotational positional displacement $\theta_{pitch}$ about the Y-axis. Furthermore, the optical paths A and E are made parallel to each other in proximity to the target surface 300, thereby enabling measurement of the rotational positional displacement $\theta_{pitch}$ along the pitch direction by a simple formula.

The positional displacement $\theta_{roll}$ along the roll direction can be obtained using the positional displacement Y along the Y-direction and the image displacements $Y_A$ and $Y_B$ as shown in the following formula (7).

$$\theta_{roll}=a\tan[(K_{ZR}/K_{ROLL}*(Y_A+Y_B)-2Y]/\tan\theta_{ODA})/(d_{roll}-2Z\tan\theta_{ODA})] \quad (7)$$

$K_{ROLL}$ is a correction factor related to the fact that the terms $Y_A$ and $Y_B$ are derived from inclined optical paths and through different optical elements than the term 2Y, which may be based on formula (3). $K_{ZR}$ is a scale factor between the image displacements due to roll and the positional displacement in the roll direction, and generally depends on design geometry and magnification, as well as production deviations exhibited by each individual unit. $K_{ROLL}$ and $K_{ZR}$ may be established by analysis and/or calibrated based on experiment. The optical paths A and B are inclined in opposite directions, and the Y-coordinates of the areas TA and TB are the same. The arrangement of the optical paths A and B as described above makes it possible to measure the rotational positional displacement $\theta_{roll}$ along the roll direction by a simple formula. The target surface 300 rotates about the X-axis according to the rotational positional displacement $\theta_{roll}$. Due to this displacement, the positions of the speckle producing areas TA and TB change in the Z-direction. Further, due to the inclination angles AngA and AngB (e.g., at the angle $\theta_{ODA}$) that are used for imaging, the Z displacement is reflected in the imaged positions of the areas TA and TB along the Y-direction. Thus, the rotational positional displacement $\theta_{roll}$ along the roll direction can be represented using the sum of $Y_A$ and $Y_B$, and their separation along the Y-direction, as shown in formula (7). It will be appreciated that formula (7) may be sufficiently accurate for small rotation angles. For certain applications and/or larger rotation angles, an expression with fewer simplifying approximations may be used to provide better accuracy.

The above-mentioned configuration enables measurement of a six-degree of freedom (DOF) displacement. In principle, images from just the four optical paths A, B, C, and E could be used to deduce the six DOF displacements. However, this may be computationally more time consuming, and more susceptible to accuracy degradation due to non-optimal measurement angles and/or misalignment, and the like. Adding the optical path D may overcome these problems and may therefore be advantageous in some embodiments. If fewer optical paths are used, and fewer DOF displacements are determined in some applications, combining optical paths having "normal direction" imaging with optical paths having "angled direction" imaging may still be advantageous in some embodiments. Optical paths having non-zero imaging angles (e.g., AngA, AngB, etc.) are generated using the element 110. The element 110 deflects light at a predetermined deflection angle depending on the incident optical path. As a result, a positional displacement along a direction including a Z-component can be calculated with a simple configuration. An example of the element 110 will be described with reference to FIG. 4.

Figure 4:
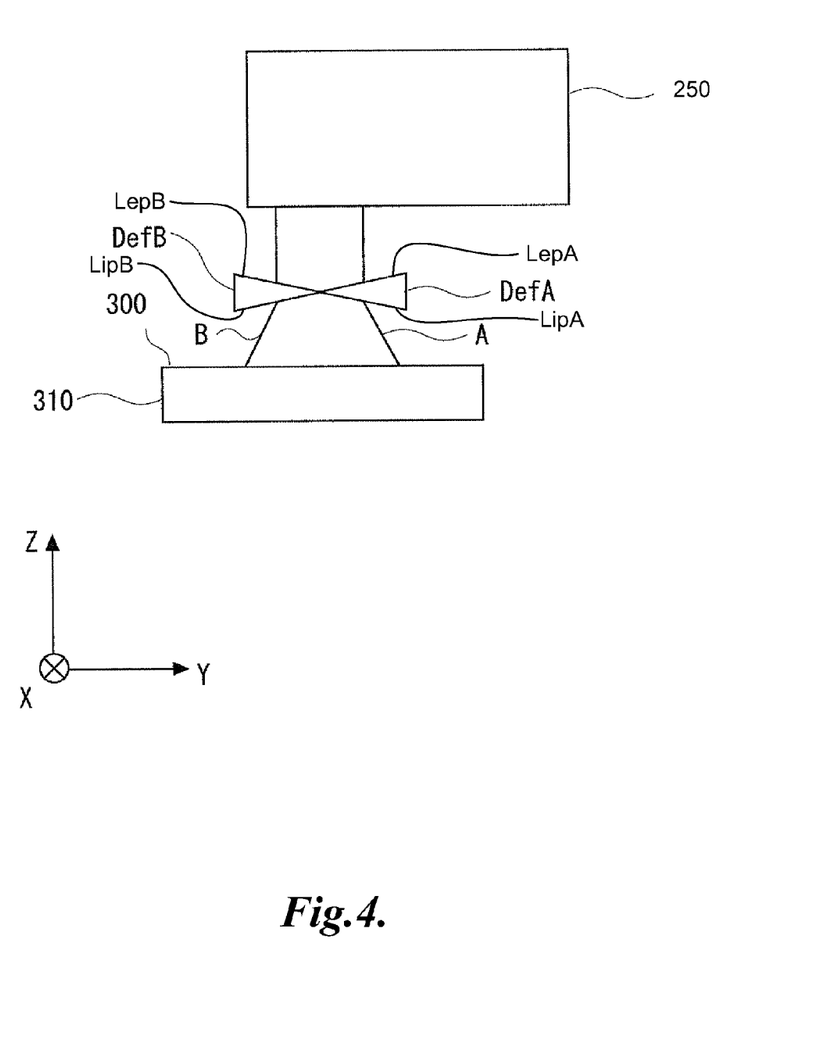
FIG. 4 is a side view of an example of a deflection element used for the image correlation displacement sensor.

FIG. 4 is a schematic side view showing an example of the element 110. The element 110 may comprise a transparent material such as glass or resin. Optical deflector elements DefA and DefB are located at the positions where the optical paths A and B are incident. In various embodiments, the optical deflector element DefA and the optical deflector element DefB each have a wedge shape. In one exemplary embodiment, a light incidence plane Lip and a light exit plane Lep of the wedge shape are inclined in opposite directions from the XY plane, by amounts that in combination provide a desired deflection angle for the corresponding light path. Further, the optical deflector element DefA and the optical deflector element DefB are symmetrically disposed such that the leading "wedge angle" edges of the wedges face each other. This particular arrangement, wherein the respective wedge angle edges are adjacent to one another, may be advantageous in various embodiments. In contrast to having the wide ends of the wedge elements adjacent to one another, having the wedge angle edges being adjacent to one another may prevent a deflected optical path from intersecting with the deflector element of a different optical path and allow a more compact design and a flexible operating gap. In the illustrated embodiment, the optical deflector element DefE may have the same configuration and layout as the optical deflector element DefA, although this configuration is exemplary only, and not limiting. The element 110 can be obtained by a combination of prisms and a substrate, if desired. At the positions where the optical paths C and D, which are parallel to the normal, are incident, the element 110 may simply comprise a substrate with parallel sides, or a hole, or may be formed with an added element wherein its light incidence plane and a light exit plane are parallel (e.g., parallel to the XY plane in one embodiment).

The configuration of the element 110 is not limited to that shown in FIG. 4. An optical element having a deflection angle that varies depending on the incident position may be used as the element 110. The element 110 may be formed using a prism, a diffraction grating, a lens, or a mirror, for example, as an optical deflector element which is a base element. Alternatively, the element 110 may be formed by a combination of different types of optical deflector elements. The arrangement of the element 110 contributes to miniaturization of the device.

In the first exemplary embodiment, speckle fields are captured through the telecentric optical system 250, which may be implemented in a small measuring head that enables six DOF measurements with high accuracy in all degrees of freedom. In various embodiments, the element 110 is arranged between the target surface 300 and the telecentric optical system 250.

Furthermore, the speckle images along the optical paths A to E are acquired by a single detector 160. In other words, the optical paths A to E are incident at different portions of a detector 160. This eliminates the need to provide a plurality of separate elements used as detectors 160, resulting in simplification of the device. In proximity to the target surface 300, the optical paths C and D are made perpendicular to the target surface 300. This improves the robustness and/or accuracy of measuring a positional displacement parallel to the XY plane.

At least one of the angles AngA, AngB, and AngE is preferably 10 degrees or more. More preferably, all of the angles are 10 degrees or more. Further, at least one of the angles AngA, AngB, and AngE is preferably set in the range of 30 degrees to 55 degrees. Setting the angles AngA, AngB, and AngE within such a range of angles enables accurate measurement in all degrees of freedom. More preferably, all of the angles are set in the range of 30 degrees to 55 degrees. This makes it possible to improve the measurement accuracy. The angles AngA, AngB, and AngE may be different in some embodiments.

In the imaging portion 240 according to the first exemplary embodiment, the element 110 is disposed on the incident side of the telecentric optical system 250. The element 110 allows the image light from each optical path or imaged region to be deflected at desired angles, for example making the optical paths A to E parallel to each other. As a result, in the first exemplary embodiment, the image light is allowed to propagate by means of a common optical system. Specifically, the image light passes through a single lens 140 and aperture 152 and enters the detector 160. This enables miniaturization of the optical system.

In the telecentric optical system 250, the optical paths A to E are allowed to pass through the common aperture 152, and thus the lens 140 can be commonly used. Consequently, an increase in the number of components is prevented.

Second Exemplary Embodiment

A displacement sensor according to a second exemplary embodiment of the present invention will be described with reference to FIG. 5. FIG. 5 is a diagram showing a second exemplary configuration of the displacement sensor 100. The displacement sensor 100 according to the second exemplary embodiment includes a second embodiment of an illumination portion 130', described further below. Otherwise, the second embodiment is a simplified form of the displacement sensor 100 according to the first exemplary embodiment, and is configured to use fewer optical paths to perform a three-degree of freedom measurement, for the translational degrees of freedom. The yaw displacement degree of freedom (a fourth DOF) may also be determined in some applications, as outlined further below. To perform the three-degree of freedom measurement, only the two optical paths A and B' are used, and thus the element 110 includes a single optical deflector element DefA. The detector 160 includes the detection portion DA and the detection portion DB'. The second embodiment of the illumination portion 130' comprises a beamsplitter 130B (e.g., a half-silvered surface) positioned between the element 110' and the lens 140, and a light source 130A (e.g., a laser). The beamsplitter 130B is arranged to receive illumination light from the light source 130A and deflect it such that it is emitted through the element 110' as the illumination light 134' to the target surface. Because the illumination light passes through the element 110', the illumination light may be thereby deflected approximately parallel to the various optical paths, to illuminate the desired regions on the target surface regardless of the operating gap. It will be appreciated that the arrangement of the illumination portion 130' could be used in combination with any of the embodiments disclosed herein. Although some speckle image light is lost at the beamsplitter 130B, a significant portion of the image light transmitted along the optical paths (e.g., the optical paths A and B') passes through the beamsplitter 130B to provide the desired speckle images. Otherwise, the basic configuration of the displacement sensor 100 according to the second exemplary embodiment is similar to that of the first exemplary embodiment, and similarly numbered and/or configured elements may be understood by analogy.

In the second exemplary embodiment, displacements along the X-direction, Y-direction, Z-direction, and yaw direction can be measured. Specifically, speckle images are captured along the two optical paths A and B'. The speckle images are captured multiple times. As a result, the image displacements $(X_A, Y_A)$ and $(X_{B'}, Y_{B'})$ of the speckle images can be obtained.

The optical path A is inclined with respect to the normal to the target surface 300, and the optical path B' is parallel to the normal. Therefore, the optical path B' is relatively insensitive to Z displacement, and we cannot determine roll or pitch measurements. We assume that there are no roll, pitch, or yaw displacements. For convenience, we take the original location of the optical path B' proximate to the region TB' as the coordinate origin O. Then, as one example of determining displacement information, we may then use the formulas (8), (9), and (10), which may be understood by analogy to previously outlined formulas.

$$X = K_X^* X_B \text{ or } X = K_X^* \text{MEAN}(X_{B'}, X_A) \quad (8)$$

$$Y = K_Y^* Y_{B'} \quad (9)$$

$$Z \approx K_Z^* (Y_B - K_{NI} Y_A)/(\tan \theta_{ODA}) \quad (10)$$

In formulas (8)-(10), $K_X$, $K_Y$, and $K_Z$ may be understood as analogous to the similarly labeled factors in previous formulas. $K_{NI}$ is a correction factor related to the fact that the term $Y_A$ is derived from an inclined optical path and through different optical elements than the term $Y_{B'}$, which is derived from a straight and normal optical path. The various K-factors may be established by analysis and/or calibrated based on experiment.

If yaw rotational positional displacement $\theta_{yaw}$ is allowed about the Z axis, then for small yaw displacements we may use formula (11):

$$\theta_{yaw} \approx a \sin(K_X^* (X_B - X_A)/(d_{yaw} - Z \tan \theta_{ODA}) \quad (11)$$

In order to provide good Z axis measurement sensitivity, at least one of the two optical paths A and B' is directed in a direction inclined with respect to the normal direction, by using the element 110. While the optical path B' is parallel to the normal direction in proximity to the target surface 300 in FIG. 5, the optical path B' may be deflected if desired, provided that the optical path B' is directed in an imaging direction different from that of the optical path A. If both the paths A and B' are deflected, the determination of displacements along the X and Y plane require more complex formulas. Such formulas may be determined by one of ordinary skill, based on the teachings of this disclosure. The speckle images are captured multiple times along the two optical paths A and B'. Thus, the displacements along the X-direction, Y-direction, Z-direction, and the yaw direction (if desired) can be measured, as outlined above.

Next, a description is given of the number of optical paths with regard to the number of directions of positional displacements to be measured, i.e., the number of dimensions in which positional displacements can be measured. In the configuration shown in FIG. 5, the four-degree of freedom displacement measurement can be made. A five-degree of freedom displacement measurement can be made by adding one optical path to the configuration shown in FIG. 5. For instance, the rotational positional displacement along the pitch direction can be measured by adding the optical path E illustrated in the first exemplary embodiment, and using formula (6). A six-degree of freedom displacement measurement may be made by adding paths as shown and described for the embodiment of FIG. 1. However, that embodiment included "redundant" optical paths to simplify computational formulas and/or increase measurement robustness. More generally, a plane is defined by three points. Therefore, at the expense of some computational complexity, if the rotational origin is assumed or known by design, a six-degree of freedom displacement measurement may be made provided that the imaging portion 240 has three or more optical paths, and the three optical paths are suitably inclined with respect to each other and with respect the normal direction in proximity to the target surface. In addition, if there are only two optical paths inclined with respect to the normal direction, they are arranged at different X and Y positions on the target surface 300. Thus, the six-degree of freedom displacement measurement can be made. Specifically, the displacements along the X-direction, Y-direction, Z-direction, and yaw direction, as well as the displacements along the roll direction or the pitch direction can be measured.

Third Exemplary Embodiment

Figure 6:
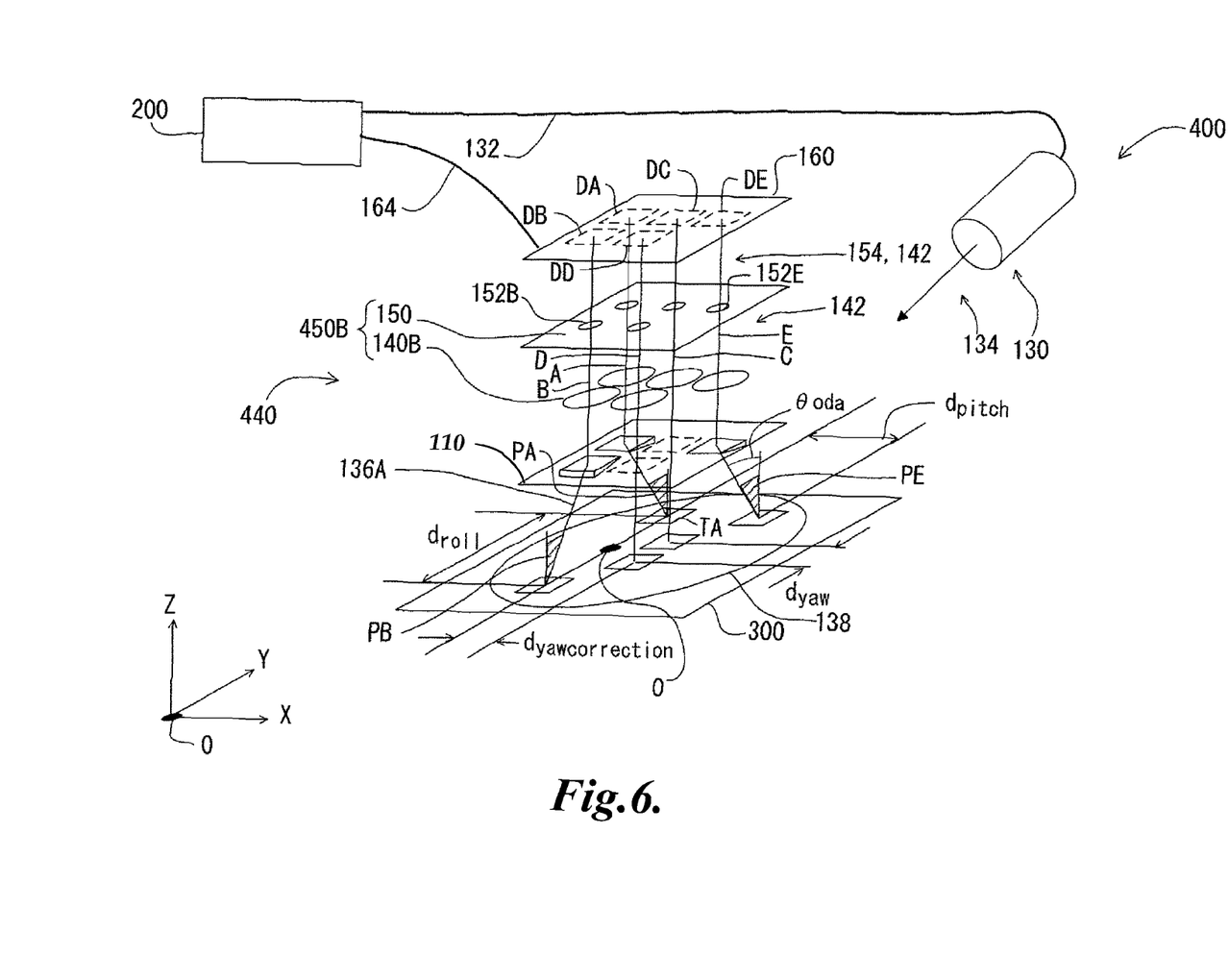
FIG. 6 is a diagram schematically showing an exemplary configuration of an image correlation displacement sensor according to a third exemplary embodiment of the present invention.

A displacement sensor 400 according to a third exemplary embodiment of the present invention will be described with reference to FIG. 6. The configuration of the third exemplary embodiment differs from that of the first exemplary embodiment in the configuration of the telecentric optical system. The basic configuration of the displacement sensor 400 is similar to that of the first exemplary embodiment, so a description thereof will be omitted as appropriate. Hereinafter, the configuration of an imaging portion 440 will be mainly described.

In the third exemplary embodiment, each of the optical paths A to E is provided with a separate lens 140. Accordingly, on the rear side of the element 110, five lenses respectively corresponding to the optical paths A to E are disposed. To simplify the explanation, assume that the lens corresponding to the optical path B is a lens 140B, and so on for the other optical paths. The lens 140B affects only the optical path B. Similarly, the lens corresponding to the optical path A is a lens 140A that affects only the optical path A, and so on. For instance, the lenses 140A to 140E may be condenser lenses having substantially the same characteristics and are disposed in the same XY plane. In one exemplary embodiment, a lens array (e.g., a molded lens array) composed of the five lenses 140A to 140E is disposed in the XY plane where the lens 140 is disposed in the first exemplary embodiment. The optical axis of each of the lenses 140A to 140E is parallel to the Z-direction.

The lens 140B is disposed immediately above the optical deflector element DefB. In other words, the optical axis of the lens 140B passes through the optical deflector element DefB. Similarly, the lenses 140A, 140C, 140D, and 140E are disposed immediately above the optical deflector elements DefA, DefC, DefD, and DefE, respectively.

In the aperture plate 150, openings are formed corresponding to the optical paths A to E. That is, the aperture plate 150 has five openings. To simplify the explanation, assume that the opening corresponding to the optical path B is an aperture 152B, and so on for the other optical paths. The aperture 152B is disposed on the optical axis of the lens 140B, and so on for the other optical paths. The optical path B is made parallel to the Z-direction by the optical deflector element DefB and enters the lens 140B. A light flux including the optical path B as a principal ray is condensed by the lens 140B and passes through the aperture 152B. In this case, the distance between the lens 140B and the aperture plate 150 approximately matches the focal length of the lens 140B. Accordingly, the lens 140B and the aperture 152B of the aperture plate 150 constitute a telecentric optical system 450B, and so on for the other optical paths A and C-E. The optical path B passes through the telecentric optical system 450B and enters the detection portion DB. The other optical paths are arranged in a similar manner. Thus, the imaging portion 440 has five telecentric optical systems. In other words, the telecentric optical systems are separately provided for each optical path. This configuration enables precise adjustment of the optical paths.

Fourth Exemplary Embodiment

Figure 7:
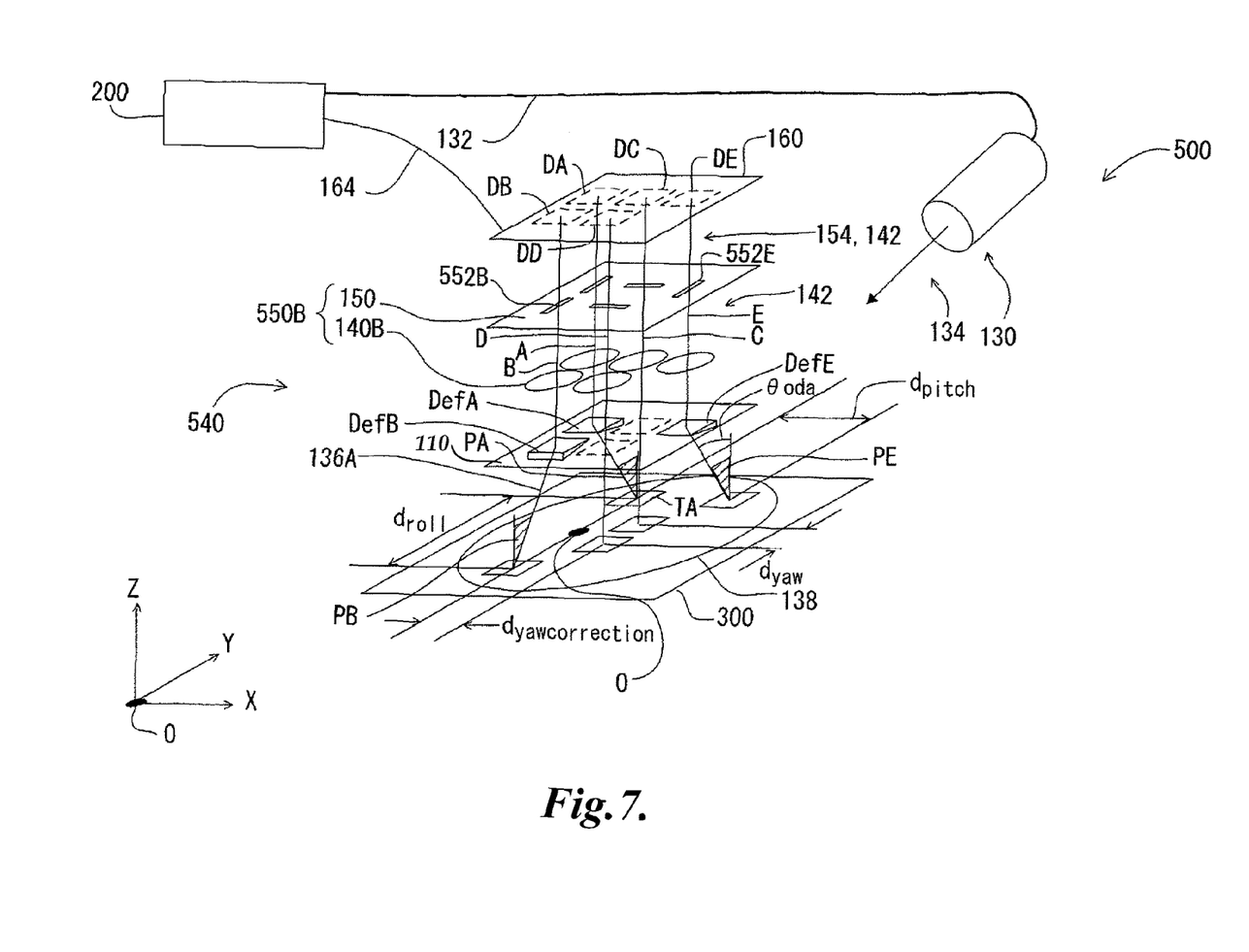
FIG. 7 is a diagram schematically showing an exemplary configuration of an image correlation displacement sensor according to a fourth exemplary embodiment of the present invention.

A displacement sensor 500 according to a fourth exemplary embodiment of the present invention will be described with reference to FIG. 7. The configuration of the fourth exemplary embodiment differs from that of the third exemplary embodiment in the configuration of the telecentric optical system only in terms of the shape of the included apertures, and related effects. The basic configuration of the displacement sensor 500 is similar to that of the third exemplary embodiment, so a redundant description thereof will be omitted as appropriate. Hereinafter, the configuration of an imaging portion 540 will be mainly described.

In the fourth exemplary embodiment, each opening formed in the aperture plate 150 has a slit shape. In contrast to the openings in the first to third exemplary embodiments, which have a circular shape, in one exemplary embodiment each opening in the fourth exemplary embodiment has a linear or elongated shape. Also in the fourth exemplary embodiment, the openings are provided for each optical path, as with the third exemplary embodiment. Assume herein that the opening corresponding to the optical path B is a slit aperture 552B, and so on for the other optical paths A and C-E. Similarly, the openings corresponding to the optical paths A and C-E are slit apertures.

Lenses respectively provided to the optical paths between the aperture plate 150 and the element 110 may be cylindrical lenses, each having a cylinder axis aligned parallel to its corresponding slit aperture. The optical path B passing through the optical deflector element DefB enters the lens 140B which is a cylindrical lens. Then, the light beam 142 propagating along the optical path B is refracted by the lens 140B and enters the aperture plate 150. The light beams 142 passing through the slit aperture 552B of the aperture plate 150 are light beams 154 that enter the detection portion DB, and so on for the other optical paths A and C-E. Light incident on the outside of the slit opening 552B of the aperture plate 150 is blocked.

The cylindrical lens nominally refracts light only in one of the X-direction and Y-direction. Accordingly, the light propagating along the optical path B on the aperture plate 150 includes a linear spreading of the image (e.g., the speckles in the image) in one direction. The slit aperture is parallel to the linear spreading. This allows the light having the linear spreading to effectively pass therethrough.

Furthermore, in the fourth exemplary embodiment, each of the detection portions DA to DE may be a one-dimensional line sensor. Specifically, the detection portions DA to DE each include a plurality of pixels arrayed along a respective axis of image motion which they are intended to detect, with each pixel elongated transverse to that axis (e.g., parallel to the longitudinal direction of the slit openings). Then, a correlation processing is executed based on a one-dimensional image. For the correlation processing based on a one-dimensional image, methods disclosed in U.S. Pat. Nos. 6,256,016 and 6,642,506, for example, may be employed. For example, a correlation value for a one-dimensional image can be obtained by setting M=1 in Formula (2) in the column 18 of U.S. Pat. No. 6,642,506. Further, the processing portion 200 calculates six-degree of freedom displacements in the manner as described in the first exemplary embodiment.

In the fourth exemplary embodiment, a one-dimensional speckle image is acquired using the cylindrical lens and the slit opening. The correlation processing based on the one-dimensional speckle image reduces the calculation time.

Other Exemplary Embodiments

In the above exemplary embodiments, the directions of displacements to be measured are determined based on the three-dimensional Cartesian coordinate system, but the directions may be determined in various ways. Specifically, displacements along directions other than the X-direction, Y-direction, Z-direction, yaw direction, pitch direction, and roll direction may be measured. For instance, a displacement along a direction including a Z-component may be measured instead of measuring the displacement specifically along the Z-direction. The displacement along the direction including the Z-component can also be measured using two optical paths having different angles. The displacement described above is not limited to a displacement based on the relative movement of the object to be measured and the measuring head, but includes various modifications of the object to be measured.

Any processing of the processing portion 200 may be implemented by hardware, or may be implemented by causing a CPU (Central Processing Unit) to execute a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The displacement sensors described in the above exemplary embodiments can be applied to various applications. Although the present invention has been described above with reference to exemplary embodiments, the present invention is not limited to the above exemplary embodiments. It is easily understood by those skilled in the art that the modes and the details of the present invention can be modified in various ways without departing from the sprit and scope of the invention. The first, second, third and fourth exemplary embodiments can be combined as desirable by one of ordinary skill in the art.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The embodiments of the invention in which an exclusive property or privilege is claimed are defined as follows:

1. An image correlation displacement sensor for measuring a positional displacement relative to a target surface, the image correlation displacement sensor comprising:
   an illumination portion which emits illumination light to the target surface to produce a speckle field;
   an imaging portion including a detector, a first optical path which is used to capture a plurality of images of the speckle field produced on the target surface and is inclined with respect to a normal to the target surface within a distance of the target surface to capture an image, and a second optical path which is used to capture a plurality of images of the speckle field produced on the target surface and is inclined with respect to the first optical path within a distance of the target surface to capture an image, the imaging portion including an element which deflects at least one of the first and second optical paths, wherein the first and second optical paths enter different parts of the detector; and
   a processing portion which measures a displacement relative to the target surface along a direction which includes a component normal to the target surface in accordance with determining a first image displacement based on image correlation processing using images from the plurality of images captured in the first optical path and determining a second image displacement based on image correlation processing using images from the plurality of images captured in the second optical path, and determining the component normal to the target surface based on a relationship between the first and second image displacements.

2. The image correlation displacement sensor according to claim 1, wherein the processing portion measures a displacement relative to the target surface along a direction that is normal to the target surface.

3. The image correlation displacement sensor according to claim 1, wherein:
   the imaging portion further has a third optical path which is used to capture a plurality of images of a portion of the speckle field and is inclined with respect to a normal to the target surface within a distance of the target surface to capture an image, the portion being different from that captured in the first optical path; and
   the processing portion measures a displacement relative to the target surface about an axis parallel to the target surface in accordance with determining the first image displacement based on image correlation processing using images from the plurality of images captured in the first optical path, determining a third image displacement based on image correlation processing using images from the plurality of images captured in the third optical path, and determining the displacement relative to the target surface about an axis parallel to the target surface based on a relationship between the first and third image displacements.

4. The image correlation displacement sensor according to claim 3, wherein a first angle between the first optical path and the normal to the target surface is equal to a third angle between the third optical path and the normal to the target surface.

5. The image correlation displacement sensor according to claim 3, wherein:
   the imaging portion further includes a fourth optical path which is used to capture a plurality of images of a portion of the speckle field and is inclined with respect to the normal to the target surface within a distance of the target surface to capture an image, the portion being different from those captured in the first optical path and in the third optical path; and
   the processing portion measures a displacement relative to the target surface about a roll axis parallel to the target surface and a displacement relative to the target surface about a pitch axis parallel to the target surface in accordance with determining the first image displacement based on image correlation processing using images from the plurality of images captured in the first optical path, determining the third image displacement based on image correlation processing using images from the plurality of images captured in the third optical path, determining a fourth image displacement based on image correlation processing using images from the plurality of images captured in the fourth optical path, determining the displacement relative to the target surface about the roll axis parallel to the target surface based on a relationship between a first pair of the first, third, and fourth image displacements, and determining the displacement relative to the target surface about the pitch axis parallel to the target surface based on a relationship between a second pair of the first, third, and fourth image displacements.

6. The image correlation displacement sensor according to claim 1, wherein:
   the first and second optical paths include a telecentric optical system; and
   the element which deflects is located between the target surface and an input side of the telecentric optical system.

7. The image correlation displacement sensor according to claim 6, wherein the first and second optical paths are approximately parallel in the telecentric optical system.

8. The image correlation displacement sensor according to claim 6, wherein:
   the telecentric optical system has a lens and an aperture; and
   the first and second optical paths pass through different parts of the lens and pass through an opening of the aperture.

9. The image correlation displacement sensor according to claim 6, wherein:
   the imaging portion comprises a first lens, a second lens, and an aperture;
   the first optical path passes through the first lens and a first opening of the aperture; and
   the second optical path passes through the second lens and a second opening of the aperture.

10. The image correlation displacement sensor according to claim 9, wherein each of the first lens and the second lens is a cylindrical lens.

11. The image correlation displacement sensor according to claim 9, wherein each of the first opening and the second opening is a slit opening.

12. The image correlation displacement sensor according to claim 9, wherein the imaging portion captures the speckle field using one dimensional detector arrays.

13. The image correlation displacement sensor according to claim 1, wherein:
   the detector is a single detector which has a pixel array.

14. The image correlation displacement sensor according to claim 1, wherein the second optical path is approximately normal to the target surface within a distance of the target surface to capture an image.

15. The image correlation displacement sensor according to claim 1, wherein the first optical path and the second optical path are substantially coplanar in a first plane.

16. The image correlation displacement sensor according to claim 15, wherein the first plane is approximately normal to the target surface.

17. The image correlation displacement sensor according to claim 1, wherein:
the first optical path passes through a first optical deflector element of the element which deflects; and
the second optical path passes through a second optical deflector of the element which deflects.

18. The image correlation displacement sensor according to claim 17, wherein a first angle between the first optical path and the normal to the target surface is substantially equal to a second angle between the second optical path and the normal to the target surface.

19. The image correlation displacement sensor according to claim 17, wherein the first and second optical paths converge toward the target surface.

20. The image correlation displacement sensor according to claim 17, wherein the first and second optical paths diverge as the first and second optical paths progress toward the target surface.

21. The image correlation displacement sensor according to claim 1, wherein at least one angle of a first angle between the first optical path and the normal to the target surface and a second angle between the second optical path and the normal to the target surface is equal to or more than 10 degrees.

22. The image correlation displacement sensor of claim 21, wherein each of the first and second angles is equal to or more than 10 degrees.

23. The image correlation displacement sensor of claim 21, wherein at least one of the first and second angles is between 30 and 55 degrees.

24. The image correlation displacement sensor according to claim 1, wherein:
the imaging system comprises at least one lens positioned such that the first and second optical paths pass through a lens;
the element which deflects is located between the target surface and an input side of the at least one lens; and
the illumination portion comprises a light source and beam splitter positioned between the element which deflects and the input side of the at least one lens, and the beam splitter is positioned to receive illumination light from the light source and deflect the illumination light such that it is emitted through the element to the target surface.

* * * * *